May 17, 1960  J. HERTRICH  2,936,894
CENTRIFUGAL DRIVING AND SUSPENSION MEANS
Filed April 6, 1954
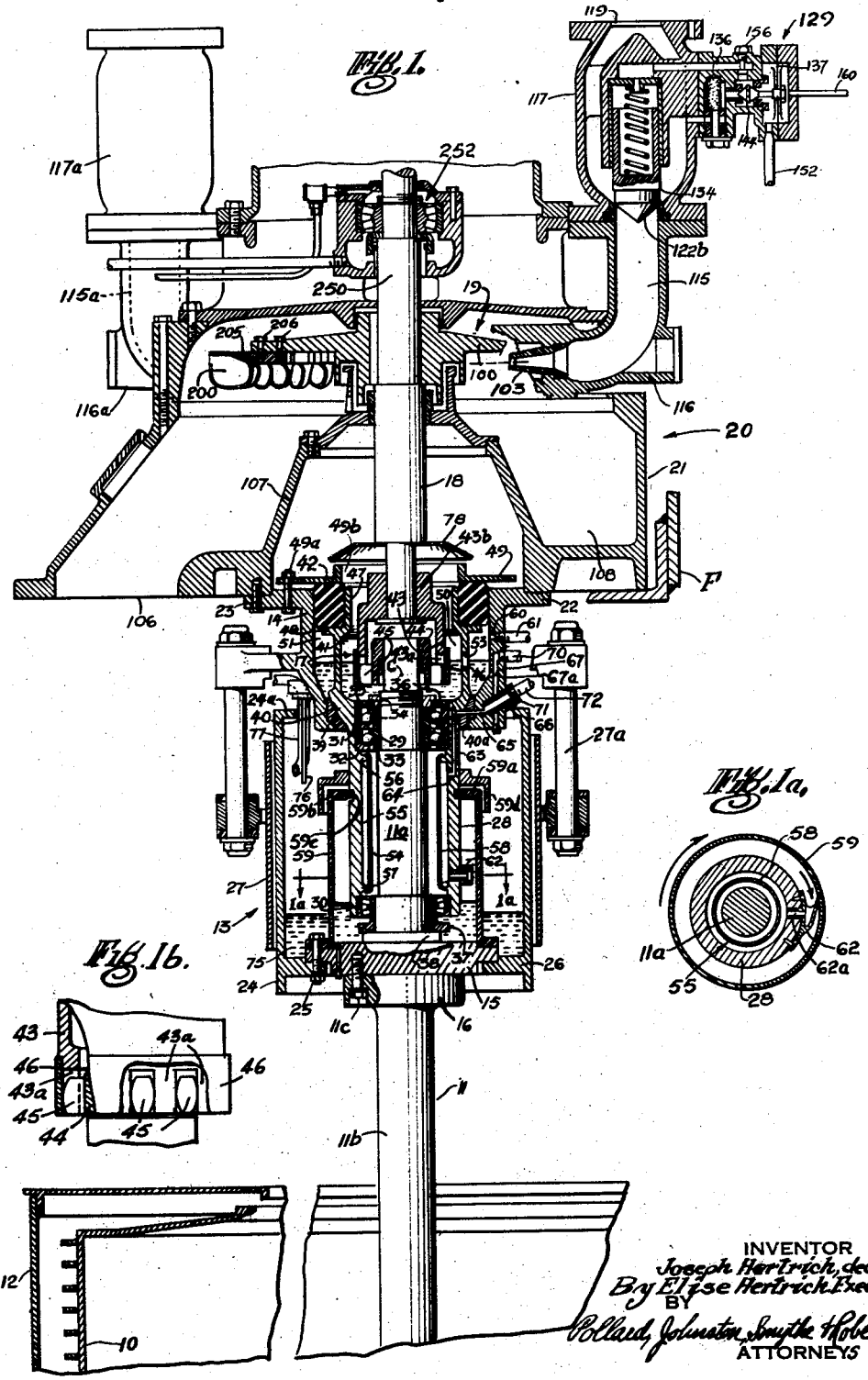
INVENTOR
Joseph Hertrich, deceased,
By Elise Hertrich, Executrix
BY
Pollard, Johnston, Smythe & Robertson
ATTORNEYS

United States Patent Office

2,936,894
Patented May 17, 1960

2,936,894

CENTRIFUGAL DRIVING AND SUSPENSION MEANS

Joseph Hertrich, deceased, late of Hamilton, Ohio, by Elise Hertrich, executrix, Hamilton, Ohio, assignor to The Western States Machine Company, Hamilton, Ohio, a corporation of Utah Application April 6, 1954, Serial No. 421,383

10 Claims. (Cl. 210—366)

This invention relates to new and useful improvements in centrifugal machines and particularly to suspension and driving means for gyratory centrifugals of the type commonly used for the manufacture of sugar.

The invention is particularly adapted for the improvement of turbine-driven centrifugal machines, but various features of its construction and operation may be used to advantage for other types of suspended gyratory centrifugal machines.

An important object of this invention is to provide an improved arrangement of a driving system for turbine-driven sugar centrifugals of a type which is relatively simple and and economical in construction and installation and which gives a stable and reliable operation to, at and from high speeds of rotation.

Another object of this invention is to provide new and improved centrifugal drive, head and brake constructions and combinations thereof, particularly adapted for turbine-driven centrifugals but not necessarily restricted thereto, which are characterized by compactness and durability and which reduce requirements for expensive bearings and for head room in the installation of the machines, while avoiding difficulties from overheating and wear that are likely to occur in the intensive service of high speed centrifugal machines.

Another object of this invention is to provide for turbine-driven centrifugal machines an organization of the turbine shaft with the suspension head of the basket spindle which eliminates the need for an expensive bearing and allows the turbine wheel to be mounted much closer to the center of gyration of the centrifugal than in known machines of this type.

Among other objects of this invention are: To provide a simple and efficient system of continuous forced lubrication for the suspension head bearings of the centrifugal machine to insure a continuous and sufficient supply of oil to and safe operation of these heavily loaded parts; to provide a suspension head construction which comprises such a forced lubrication system along with provisions for a water-cooled brake mounted on the spindle near the level of its center of gyration and at the same time prevents mingling of the cooling water with the lubricating oil and permits ready dismounting of the assembly; and to provide new turbine driven centrifugal combinations by which a turbine having particular power characteristics may be replaced by another turbine having different characteristics without any necessity for changing the controls or other parts of the machine.

A centrifugal machine according to this invention includes, in combination, a turbine having an impulse wheel and a vertical driving shaft carrying said wheel and rotatably mounted in a fixed bearing above the wheel, a centrifugal basket spindle, flexibly interlocking coupling members forming a flexible coupling for positively transmitting torque between the driving shaft and the basket spindle at the level of the center of gyration, and means restricting relative lateral displacement of the interlocking members at the center of gyration so that the coupling members also serve as an antifraction bearing to sustain radial loads at the coupled ends of the driving shaft and basket spindle.

According to another feature of the invention, the rotary basket spindle is surrounded by a non-rotary sleeve spaced from the spindle to accommodate bearings for rotatably supporting the spindle in the sleeve, and there are means for introducing oil into the space between the sleeve and spindle for passage downward through that space, to bathe the bearings, and thence into an oil receptable mounted on the shaft in surrounding relation to the lower portion of the sleeve, from which receptacle an excess of accumulated oil is discharged for recirculation by the action of oil removal means rendered operative during the operation of the centrifugal.

Other objects, features and advantages of this invention will be apparent from the following detailed description of an illustrative embodiment and from the accompanying drawings thereof.

In the drawings:

Fig. 1 is a vertical section through an illustrative embodiment of this invention with the basket broken away and showing the turbine wheel partially in side elevation and partially in section;

Fig. 1a is a horizontal cross-section taken along line 1a—1a of Fig. 1; and

Fig. 1b shows in elevation elements of the flexible coupling at the center of gyration of the machine, with parts broken away to reveal curvatures of the interlocking teeth.

Referring first to Fig. 1, a usual perforate centrifugal basket 10 is disposed within a surrounding curb or casing 12 and is rotatably carried by a suspended spindle 11 for rotation therewith. The spindle is suspended by a suspension head, indicated generally at 13, from a stationary hanger 14 which carries the weight of the basket and spindle. The spindle 11 is formed in two separate sections 11a and 11b which are bolted together by bolts 11c that extend through bores in flanges 15 and 16 formed externally on sections 11a and 11b, respectively. The lower section carries the basket, and the upper section is connected through a flexible coupling 17 with the lower end of a vertically disposed drive shaft 18, to which is secured the impulse wheel 19 of a water turbine 20. This wheel is enclosed within a water housing 21, the base of which rests on conventional supporting framework F. The stationary hanger 14 is formed with an integral external flange 22 by which it is bolted directly to the base of the water housing 21, as at 23.

A centrifugal brake drum 24 is detachably secured directly to the spindle for rotation therewith and surrounds the suspension head assembly, extending axially in concentric spaced relation thereto. Drum 24 is bolted to the spindle by bolts 25 which extend through aligned bores in a flange 26 formed internally on the drum and overlapping flange 15 of spindle section 11a. The drum is arranged to be engaged by friction brake bands 27 supported from hanger rods 27a in known manner.

A non-rotary hollow sleeve 28 surrounds the upper section 11a of spindle 11 and has an upward extension 41 that surrounds and extends to a location above the flexible coupling 17 in spaced relation thereto. The radial and thrust loads on the spindle 11 are transmitted directly from the spindle to the sleeve 28 by vertically spaced sets of bearings 29 and 30, which are disposed between the spindle and the sleeve.

The upper bearings 29 are preferably a double set of radial and thrust ball-bearings having their inner races seated on a cylindrical portion of spindle section 11a, over shoulder 33 thereof, and their outer races resting against cylindrical portion 31 of sleeve 28 on an upwardly facing shoulder 32 of the sleeve, and a nut 34 threaded on the spindle section bears downwardly against the inner races so as to hold the bearings firmly in working position. A ring or cap 35 overlies the thrust bearings and is provided with passages 36 to direct lubricating fluid to the bearings from an oil chamber formed by the sleeve extension 41. The ring 35 is confined axially between the nut 34 and the upper outer race of the bearings.

The lower bearings 30 comprise a set of self-aligning roller bearings disposed at the lower end of the gyratory sleeve 28 between opposing cylindrical portions of the sleeve and spindle 11a. The inner race abuts an annular collar 37 held between it and an enlarged spindle portion 38 below the collar.

An enlarged portion of the gyratory sleeve just below the extension surrounding flexible coupling 17 is formed with a convexly spherical surface or ball element 39 that fits into a complementary concavely spherical, upwardly facing surface 40 of a stationary annular ring or socket element 40a. Socket element 40a is supported by the stationary hanger 14. It will be understood that the ball and socket arrangement 39—40a supports the assembly of the sleeve 28, while permitting this assembly to gyrate about the center point C of the ball and socket elements in response to unbalanced basket loads or changes of basket load distribution which occur in the operation of the machine.

A positive drive connection is provided between the non-gyratory turbine drive shaft 18 and the gyratory basket spindle extension 11a by means of the flexible coupling 17 which permits the necessary oscillatory movements of the spindle assembly about the center of gyration at C, and this same coupling is here made to serve also as a radial antifriction bearing for the lower end of the drive shaft so as to eliminate the need for a ball or roller bearing at that location. Coupling 17 is disposed at the level of the center of gyration. It comprises a collar 44 fixed to the upper end of spindle section 11a and having a circular series of radial teeth 45 which are evenly spaced apart and are fitted between the spaced axially extending teeth 43a of a driving ring 43b fixed to the lower end of the turbine shaft 18. The teeth 45 of the gyratory collar 44 are "crown" teeth which have convex lateral surfaces engaging the adjacent flat surfaces of the teeth 43a on ring 43 and convex outer surfaces to engage the inner face of a sleeve 46 which is fixed to ring 43 in surrounding relation to the series of interfitting teeth 45 and 43a. The sleeve 46 serves to restrict or prevent lateral displacement of the axis of the turbine shaft relative to the axis of spindle section 11a at the center of gyration while still permitting the needed gyratory movement of the spindle assembly in the course of the centrifugal operations. By this construction, the flexible coupling serves not only to transmit torque from the turbine to the spindle but also acts as an antifriction radial bearing to sustain the lateral or radial loads acting on the lower end of the turbine shaft.

Swinging movement of the basket and spindle assembly away from the normal axis of rotation is resisted by a resilient buffer ring 42, preferably made of rubber, which is disposed at a level above the center of gyration C and is confined between an upwardly and outwardly facing seat formed by flanges 47 and 48 at the top of sleeve extension 41 and an oppositely facing seat formed by an inner cylindrical surface of hanger 14 and an overhanging annular plate 49 which is movably fastened to the hanger by bolts 49a. The buffer ring 42 affords the desired yielding resistance to the gyratory movements of the basket and spindle assembly, and the degree of this resistance can be adjusted by adjusting the plate fastening bolts 49a, or by substituting a different buffer ring below plate 49, without dismounting the head of the machine.

A cover or shield 78 on shaft 18 overlies a central opening 49b in plate 49, through which the coupling ring 43 may be lifted freely whenever it is desired to remove the housing 21 and the driving motor from the machine.

Further in accordance with this invention, the suspension head is provided with means for maintaining a continuous forced circulation of oil through its bearings and over other rubbing parts for simultaneously lubricating and cooling the same, and the same head is provided with means for cooling the surrounding friction brake drum 24 with a regularly replenished body of cooling water. As shown in Fig. 1, an oil inlet port 60 is formed in the side wall of hanger 14 to deliver lubricating oil fed through a conduit 61 into an annular chamber 51 formed inside the hanger between its side and the inwardly spaced upward extension 41 of sleeve 28. A concentric chamber 50 is formed at the inner side of extension 41 in surrounding relation to the flexible coupling 17. A radially extending passage 53 in extension 41 connects chamber 50 with chamber 51 so that oil fed into the latter through port 60 will overflow into chamber 50 and can be maintained at a level inundating the working surfaces of the coupling 17.

It will be seen that the space between the spindle section 11a and the gyratory sleeve 28 not only provides clearance to accommodate the upper and lower bearing sets 29 and 30 but also contains between these bearings an annular partition 58 which defines inner and outer passages 54 and 55, respectively, for the circulation of lubricating oil. Axially spaced flanges 56 and 57 on the inside of the gyratory sleeve 28 support and are sealed to the upper and lower ends of the partition. Thus the partition 58, sleeve 28 and spindle 11a form an inner annular passage 54 through which oil passes from the upper bearings to the lower bearings, and between the partition and sleeve 28 there is a separate annular passage 55 through which used oil may be returned to the oil supply system (not shown) in a manner yet to be described.

It will be evident that oil present in chamber 50 of the sleeve extension will flow by gravity through passages 36 of the upper bearing cap 35, will then bathe all the parts of the upper bearings 29, and then will flow through the inner annular passage 54 to inundate moving parts of the lower bearings 30.

As the oil leaves the lower bearings it passes into an oil reservoir which is formed around the lower portion of sleeve 28 by means of an annular wall 59 secured to an upper surface of the flange 15 of spindle section 11a. Wall 59 is spaced inwardly from the friction drum 24 and spaced outwardly from sleeve 28, and it extends upwardly from flange 15 in that spaced relationship to a suitable location where a top wall 59a extends inwardly from wall 59 to form a running seal with the outer periphery of sleeve 28. This seal is formed by an inward flange 59b of wall 59a extending into the confines of an outwardly facing annular groove 59c in sleeve 28. An annular shield or cap 59d is fitted on sleeve 28 above wall 59a and extends over that wall and around it and the uppermost part of wall 59 so as to prevent cooling water inside the brake drum 24 from entering into the oil reservoir formed by wall 59.

The oil flowing past the lower bearings at 30 thus accumulates in the oil reservoir surrounding these bearings, and as the machine is operated excess oil is regularly removed from the oil reservoir by the action of a stationary scoop 62 which is fitted into a radial opening in sleeve 28 and has an oil passageway 62a for conducting oil from the reservoir formed by wall 59 into the outer oil passage 55 formed between sleeve 28 and partition 58. As shown more fully in Fig. 1a, the scoop 62 has a mouth disposed in the path of movement of oil which rises on and rotates with the inner surface of wall 59 as the machine rotates at high speed. Since the mouth opens in a direction opposite to the direction of rotation, oil on the rotating wall 59 is scooped therefrom and flows under pressure through port 62a into annular passage 55. When passage 55 is filled with oil, the excess oil may be discharged through communicating ducts 64, 63 and 65, which extend through sleeve 28, ring 40a and hanger 22 into bore 66 of a fitting 71 connected by pipe 72 with a suitable oil cooling and supply system (not shown). A suction pump preferably is connected with pipe 72 to assure the continued removal of used oil accumulated in passage 25.

The excess oil in the head may be discharged by gravity, if desired, in which event fitting 71 may be removed and the hanger opening closed by a pipe plug screwed in the place of this fitting. Duct 65 then opens into an upright duct 67 in hanger 14, which opens into an overflow pipe 70 located at the desired maximum level of oil in the chambers 50 and 51. In this arrangement, the feed pipe 61 has a shut-off valve, preferably solenoid-operated, which will stop the inflow through pipe 61 whenever the machine stops, i.e., whenever the scoop 62 ceases to be active due to insufficient rotation of reservoir wall 59. In this manner of use of the structure, oil pumped upward by the scoop action flows through duct 67 and is discharged by gravity through the overflow pipe 70. By reason of port 67a between chamber 50 and chamber 51, the duct 67 and overflow pipe 70 provide protection against overfilling of the head with lubricating oil in any manner of use of the structure.

It will be seen that during operation of the centrifugal lubricating oil is circulated in a positive manner by admitting oil into a stationary part of the head (the hanger), passing the oil by gravity to upper and lower bearings supporting the rotating parts of the assembly, and then forcibly returning the oil by self-contained means in the head to the stationary hanger for return to the oil cooling and supply system and subsequent recirculation through the head.

A regulated circulation of brake cooling water also is maintained during operation of the machine, the supply of this water being introduced into the brake drum 24 through inlet pipe 76 and excess water being removed from the inner surface of the drum in the running phase of each centrifugal cycle by the action of a scoop-like end of discharge pipe 77. During the running phase, the water walled up against the drum is prevented from overflowing by top flange 24a on the drum and by the scooping action of pipe 77. When the machine is stopped, the water supply through pipe 76 is stopped by the operation of a suitable shut-off valve (not shown). The shield and sealing devices at 59b, c and d not only prevent water inside the drum from reaching the oil inside wall 59 but also prevent this oil from spilling into the space for the cooling water.

With the described head and drive arrangement, the brake is conveniently disposed on the spindle between the driving means and the basket of the machine and near the center of gyration of the spindle and basket assembly, and all parts of the suspension head as well as the flexible coupling, the brake elements, and the feed and discharge lines for lubricating oil and brake cooling water are organized together in a compact arrangement which is relatively easy to assemble and disassemble and which makes optimum use of the limited head room normally available at the machines.

In association with the structure described above, a suitable driving system is provided for the gyratory basket and spindle assembly. The particular driving system shown has new features of construction and control which give important operating advantages. New features of it are described and claimed in a copending application Serial No. 501,684, filed April 6, 1955 as a division of this application. With reference to the driving unit 20 of Fig. 1, the impulse or water wheel 19 within housing 21 has a hub 100 to the periphery of which is fixed a set of spaced impulse buckets 200. A pair of nozzles 103, only one of which appear in the drawing, are spaced 180° apart and arranged in the housing so as to direct separate jets of water against the buckets 200 at diametrically opposed parts of their orbit. At its lower end the housing 21 is provided with an outlet 106 through which water is discharged from the housing. An inner casing 107 surrounds the turbine shaft 18 below wheel 19 and slopes downwardly and outwardly to the base of the housing so as to close off the interior of the water housing from the upper end of the flexible coupling and head assembly.

The impulse wheel buckets 200 have the function of extracting energy from the water jets discharged from nozzles 103 so as to drive the wheel and the shaft and spindle connected with it.

Control of the power developed by the water turbine for bringing the centrifugal machine to the desired full operating speed is effected by water flow control valves 117 and 117a which respectively regulate the water flow through nozzles 103. To provide the high power necessary for acceleration of the machine, both nozzles are opened to direct two separate jets against the wheel. When the full speed is reached either of the nozzles may be closed to continue the full speed operation under the reduced power of the jet from the other nozzle, or both of the nozzles may be closed so as to allow the machine to coast at high speed without continued motive power. The control valves are pressure responsive quick acting valves which are particularly suitable for remote control by suitable automatic control means.

The nozzles 103 are mounted in the ends of respective housings 116 and 116a which form water passages 115 and 115a extending from the respective control valves 117 and 117a. Each nozzle housing is detachably supported as a removable segment of the water housing 21 so that it can easily be removed and replaced in order to substitute a nozzle of different size, or for any other reason.

In the use of the disclosed machine, the inlet 119 of each control valve is connected with a source of water held constantly under a pressure suitable for driving the water turbine, and the compressed air line 160 of each valve is connected through a suitable air valve, for example, a hand operated or solenoid-operated three-way air valve, with a source of air held constantly under a pressure sufficient to overbalance the pilot valve spring 138. When a solenoid-operated air valve is used, it may be actuated by electrical control means of a type widely used for controlling the operations of sugar centrifugals.

If the machine is to be used with a mechanical discharger for discharging solids from the centrifugal basket, the drive shaft 18 preferably is extended above the water wheel, as indicated at 250 in Fig. 1, so as to pass through a top bearing shown at 252 and be connected with the driven clutch element of a low speed discharge drive mechanism of the type disclosed and claimed in United States Letters Patent No. 2,667,974 of Joseph Hertrich.

The operations of the present machine are carried out in any of the ways used for sugar centrifugals or other heavy cyclical centrifugal machines. When the basket is ready to be accelerated to its full running speed, compressed air is admitted to line 160 of each of the control valves 117 and 117a, whereupon the valves open and water jets from the nozzles 103 impinge against the buckets 200 of the impulse wheel. The machine then accelerates under the energy absorbed from the jets, and when the full running speed is reached at least one of the jets is cut off by releasing the compressed air from the corresponding pilot valve. This can be done manually or by actuating an air valve on line 160 by an automatic time-controlled or speed-controlled mechanism (not shown). Meanwhile, the spent water from the jets leaves the buckets 200 entirely beneath the water wheel 100 and passes through chamber 108 of the water housing to the water outlet 106.

When the machine has run for the desired period at high speed, both of the water control valves are closed and the brake 27 is applied in known manner to bring the machine to rest. During all the running period, oil is fed through pipe 61 into the lubrication system of the head, excess oil is returned to the oil supply tank (not shown) through pipe 70 or pipe 72, cooling water is fed into the brake drum through pipe 76, and excess water is discharged from the drum through scoop pipe 77.

It will be understood that each of the several new features and combinations of this invention, either alone or in combination with other new features here disclosed, may be embodied in various forms of apparatus without restriction to details of the illustrated embodiment.

What is claimed is:

1. In a centrifugal machine, the combination comprising a vertical driving shaft carrying a member for driving the same and rotatably mounted in a fixed bearing above said member, a centrifugal basket spindle, means suspending said spindle to gyrate and rotate about a center below and in alignment with the axis of said driving shaft, flexibly interlocking coupling members for positively transmitting torque between said driving shaft and said basket spindle at the level of the center of gyration, said suspending means including a non-rotary gyratory suspension sleeve surrounding said spindle in outwardly spaced relation thereto, bearing means in the space between said sleeve and said spindle for rotatably supporting said spindle in said sleeve, said sleeve having an upper extension forming an oil receptacle surrounding said coupling members, and means for conducting oil from said receptacle downwardly through said bearing means, and means restricting relative lateral displacement of said interlocking members at the center of gyration so that the coupling members also serve as an antifriction bearing to sustain radial loads at the coupled ends of the driving shaft and basket spindle.

2. In a centrifugal machine, the combination comprising a vertical driving shaft carrying a member for driving the same rotatably mounted in a fixed bearing above said member, a centrifugal basket spindle, means suspending said spindle to gyrate and rotate about a center below and in alignment with the axis of said driving shaft, a flexible coupling including members respectively secured to said driving shaft and basket spindle and each having a circular series of teeth at the level of the center of gyration interfitting with the teeth of the other member for transmitting torque between said driving shaft and said basket spindle, said suspending means including a non-rotary gyratory suspension sleeve surrounding said spindle in outwardly spaced relation thereto, bearing means in the space between said sleeve and said spindle for rotatably supporting said spindle in said sleeve, said sleeve having an upper extension forming an oil receptacle surrounding said coupling members, and means for conducting oil from said receptacle downwardly through said bearing means, and an annular bearing member carried by one of said coupling members at said level in peripheral relation to said interfitting set of teeth so that said members serve not only as a coupling but also as an antifriction bearing to sustain radial loads at the coupled ends of the driving shaft and basket spindle.

3. Apparatus as described in claim 2, the teeth of the coupling member secured to said spindle having convex lateral surfaces bearing against the teeth of the other coupling member and having convex outer surfaces to bear against said annular bearing member.

4. Suspension and driving means for a gyratory centrifugal machine comprising, in combination, a stationary hanger to be mounted on and depend from a fixed support, a non-rotary suspension sleeve mounted in and depending from said hanger, said sleeve being immovable in axial direction within said hanger but being arranged for gyratory movement therein, a rotary gyratory spindle extending vertically into and through said sleeve in spaced relation thereto, upper and lower bearing means in the space between said sleeve and said spindle for rotatably supporting said spindle in said sleeve, the upper end of said sleeve extending above said upper bearing means and forming thereabove an oil chamber within said hanger, means for supplying oil into said chamber for passage downward by gravity through said space and said bearing means, an oil receptacle mounted on said spindle for rotation therewith and surrounding the lower end of said sleeve to receive and hold oil flowing out of the space between the sleeve and spindle, a non-rotary oil passageway associated with said sleeve and in communication with said receptacle, and oil removal means operative during rotation of the spindle to discharge excess oil from said receptacle through said passageway.

5. Suspension and driving means for a gyratory centrifugal machine comprising, in combination, a rotary gyratory spindle, a non-rotary gyratory suspension sleeve surrounding said spindle in outwardly spaced relation thereto, bearing means in the space between said sleeve and the spindle for rotatably supporting said spindle in said sleeve, a stationary hanger suspending said sleeve, means for introducing oil into the space between the sleeve and spindle above said bearing means for passage downward through such space and said bearing means, an oil receptacle mounted on said spindle in surrounding relation to the lower portion of said sleeve to receive and hold oil flowing out of the space between the sleeve and spindle, a non-rotary oil passageway associated with said sleeve and extending into said hanger, said passageway communicating at one end with said receptacle and at its other end with an outlet in said hanger accessible from a location outside said hanger, and oil removal means operative during operation of the centrifugal to discharge excess oil from said receptacle through said passageway.

6. Suspension and driving means for centrifugal machines comprising, in combination, a rotary gyratory spindle, a non-rotary gyratory suspension sleeve surrounding said spindle in outwardly spaced relation thereto, bearing means in the space between said sleeve and the spindle for rotatably supporting said spindle in said sleeve, a stationary hanger suspending said sleeve, means for introducing oil into the space between the sleeve and spindle above said bearing means for passage downward through such space and said bearing means, an oil receptacle mounted on said spindle in surrounding relation to the lower portion of said sleeve to receive and hold oil flowing out of the space between the sleeve and spindle, a non-rotary oil passageway associated with said sleeve and extending into said hanger to an outlet therein accessible from a location outside the hanger, and a scoop carried by said sleeve and disposed in the receptacle in a position to take off excess oil from the receptacle during rotation of the drive shaft, said scoop being in communication with said passageway for discharging oil taken off by said scoop through said passageway.

7. Suspension and driving means for centrifugal machines comprising, in combination, a stationary hanger, a non-rotary gyratory sleeve suspended in said hanger, a rotary basket-carrying spindle extending through said sleeve in inwardly spaced relation thereto and carrying on its upper end flexible coupling means for connection with a driving shaft, bearing means in the space between said sleeve and spindle, said sleeve having an upper extension forming a lubricant chamber within which the coupling means is disposed, means for admitting oil into said chamber, said chamber having a fluid connection with the space between said sleeve and spindle for passing oil down through such space and said bearing means, an oil receptacle mounted on said spindle to receive and hold oil flowing out of such space, a non-rotary oil passageway associated with said sleeve and in communication with said receptacle, said passageway extending into said hanger to an outlet therein disposed at the desired maximum level of oil in said lubricant chamber and accessible from a location outside the hanger, and oil removal means operative during rotation of said spindle to discharge excess oil from said receptacle through said passageway, said passageway being connected with said lubricant chamber below such desired maximum level to prevent overfilling of said lubricant chamber.

8. Suspension and driving means for centrifugal machines comprising, in combination, a stationary hanger having an annular, spherically shaped socket, a non-rotary support sleeve having a ball element thereon near its upper end fitted into the socket so as to be supported vertically therein and swingable about the center of curvature of said ball and socket elements, a rotary basket-carrying spindle extending through said sleeve in inwardly spaced relation thereto, bearing means in the space between said sleeve and spindle, said sleeve having an extension above said ball element in spaced relation to the hanger and defining therewith a lubricant chamber for holding a body of oil in lubricating relation to said ball and socket elements, means for admitting oil into said chamber, said chamber having a fluid connection with the space between said sleeve and spindle above said bearing means for passing oil into such space and down through said bearing means, an oil receptacle mounted on said spindle to receive and hold oil flowing out of such space, a non-rotary oil passageway associated with said sleeve and extending into said hanger, said passageway communicating at one end with said receptacle and at its other end with an outlet in said hanger accessible from a location outside the hanger, and oil removal means carried by said sleeve and operative during operation of the centrifugal to discharge excess oil from said receptacle through said passageway.

9. Suspension and driving means for centrifugal machines comprising in combination, a rotary gyratory drive shaft, a non-rotary suspension sleeve surrounding said drive shaft in outwardly spaced relation thereto, bearing means in the space between said sleeve and said shaft for rotatably supporting said shaft in said sleeve, means for supplying oil into the space between said sleeve and drive shaft above said bearing means for passage downward through such space onto said bearing means, an oil receptacle mounted on said shaft in surrounding and spaced relation to a lower portion of said sleeve to receive and hold oil flowing out of the space between the sleeve and drive shaft, oil removal means operative during operation of the centrifugal to discharge excess oil from the receptacle, a brake drum carried by said shaft in surrounding and spaced relation to said receptacle, said drum being provided with means at top and bottom defining an inwardly facing trough for retaining a body of cooling liquid inside the drum while it is rotating, and non-rotary elements on said sleeve cooperating with rotary elements of said receptacle to exclude water in said drum from the space within said receptacle and prevent the escape of oil from the latter into said drum.

10. In a centrifugal machine, the combination comprising a vertical driving shaft carrying a member for driving the same and rotatably mounted in a fixed bearing above said member, a centrifugal basket spindle suspended to gyrate and rotate about a fixed center below and in alignment with the axis of said driving shaft, flexibly interlocking coupling members for positively transmitting torque between said driving shaft and said basket spindle at the level of the center of gyration, a non-rotary gyratory suspension sleeve surrounding the basket spindle in outwardly spaced relation thereto, bearing means in the space between said sleeve and spindle for rotatably supporting said spindle in said sleeve, said sleeve having an upper extension forming a lubricant chamber within which said coupling members are disposed, means restricting relative lateral displacement of said coupling members at the center of gyration so that said coupling members serve as an antifriction bearing to sustain radial loads at the coupled ends of said driving shaft and spindle, means for admitting oil into said chamber for lubricating said coupling members, said chamber having a fluid connection with the space between said sleeve and spindle for passing oil down through such space and said bearing means, an oil receptacle mounted on said spindle to receive and hold oil flowing out of such space, a non-rotary oil passageway associated with said sleeve and in communication with said receptacle, and oil removal means operative during operation of the centrifugal to discharge excess oil from the receptacle through said passageway.

References Cited in the file of this patent

UNITED STATES PATENTS

| | | |
|---|---|---|
| 1,734,746 | Roberts | Nov. 5, 1929 |
| 1,823,863 | Roberts | Sept. 15, 1931 |
| 2,219,875 | Roberts | Oct. 29, 1940 |
| 2,303,813 | Barcus | Dec. 1, 1942 |
| 2,312,505 | Tholl | Mar. 2, 1943 |
| 2,402,496 | Hertrich | June 18, 1946 |
| 2,502,021 | Orton | Mar. 28, 1950 |
| 2,544,367 | Tholl | Mar. 6, 1951 |

FOREIGN PATENTS

| | | |
|---|---|---|
| 903,765 | Germany | Feb. 11, 1954 |
| 136,705 | Australia | Mar. 16, 1950 |